United States Patent
Johnston et al.

(10) Patent No.: US 8,142,137 B2
(45) Date of Patent: Mar. 27, 2012

(54) COOLED GAS TURBINE VANE ASSEMBLY

(75) Inventors: Chris Johnston, Chesterfield, VA (US);
Gary Bash, Jupiter, FL (US); Tim teRiele, Palm City, FL (US); David Parker, Palm Beach Gardens, FL (US); James Page Strohl, Stuart, FL (US)

(73) Assignee: Alstom Technology Ltd (CH)

( * ) Notice: Subject to any disclaimer, the term of this patent is extended or adjusted under 35 U.S.C. 154(b) by 718 days.

(21) Appl. No.: 12/323,736

(22) Filed: Nov. 26, 2008

(65) Prior Publication Data

US 2010/0129196 A1 May 27, 2010

(51) Int. Cl.
*F03B 11/00* (2006.01)
*F01D 5/14* (2006.01)

(52) U.S. Cl. ........ 415/115; 415/116; 415/119; 415/191; 416/96 R; 416/97 R; 416/500

(58) Field of Classification Search .................. 415/115, 415/116, 119, 191; 416/96 R, 97 R, 500
See application file for complete search history.

(56) References Cited

U.S. PATENT DOCUMENTS

| | | | | |
|---|---|---|---|---|
| 6,402,471 | B1 * | 6/2002 | Demers et al. | 416/97 R |
| 6,481,959 | B1 * | 11/2002 | Morris et al. | 415/115 |
| 6,749,396 | B2 * | 6/2004 | Barry et al. | 415/115 |
| 7,121,787 | B2 * | 10/2006 | Jacks et al. | 415/115 |
| 2005/0244264 | A1 * | 11/2005 | Jacks et al. | 415/115 |
| 2007/0003407 | A1 * | 1/2007 | Turner et al. | 415/115 |
| 2010/0047056 | A1 * | 2/2010 | Lee et al. | 415/115 |

* cited by examiner

*Primary Examiner* — Michelle Mandala
(74) *Attorney, Agent, or Firm* — Shook, Hardy & Bacon L.L.P.

(57) ABSTRACT

A gas turbine vane to improve vane performance by addressing known failure mechanisms. A cooling circuit to the trailing edge of a vane airfoil is fed from the outer diameter platform, which prevents failure due to an oxidized and eroded airfoil trailing edge. The gas turbine includes an outer diameter platform, a hollow airfoil and an inner diameter platform with a plurality of cooling tubes extending radially through the airfoil. The cooling tubes are open at the outer diameter end and closed with covers at the inner diameter end. The inner diameter platform is also cooled and includes a meterplate for a portion of the cooling passageway and includes an undercut to improve thermal deflections of the inner diameter platform.

20 Claims, 7 Drawing Sheets

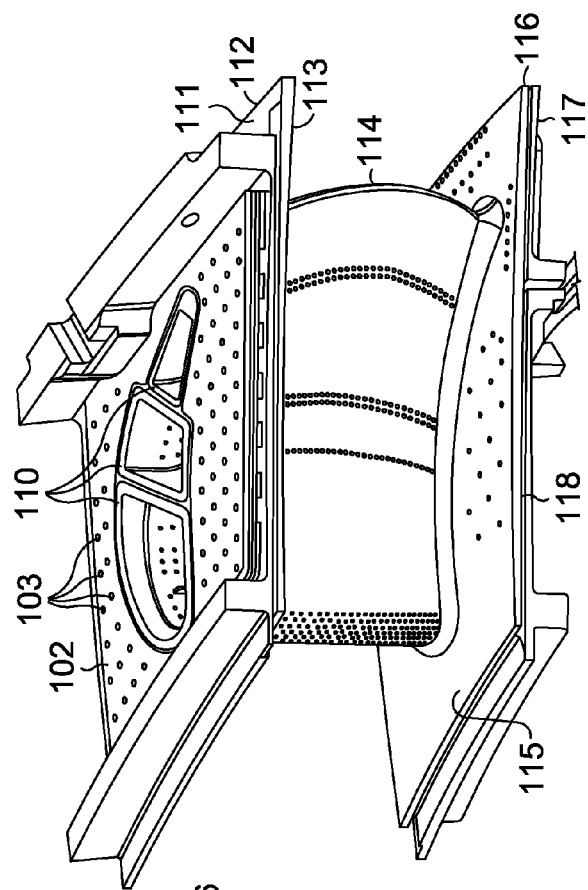
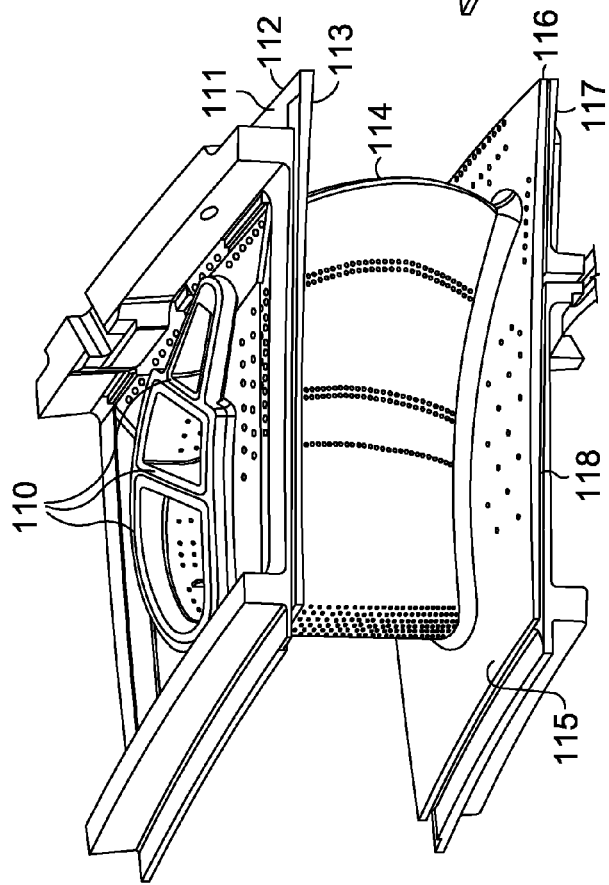

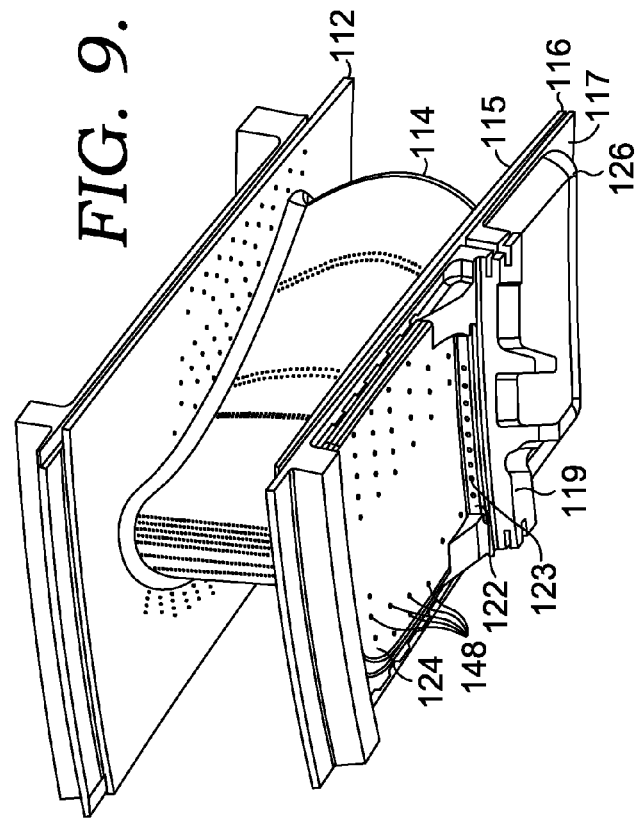
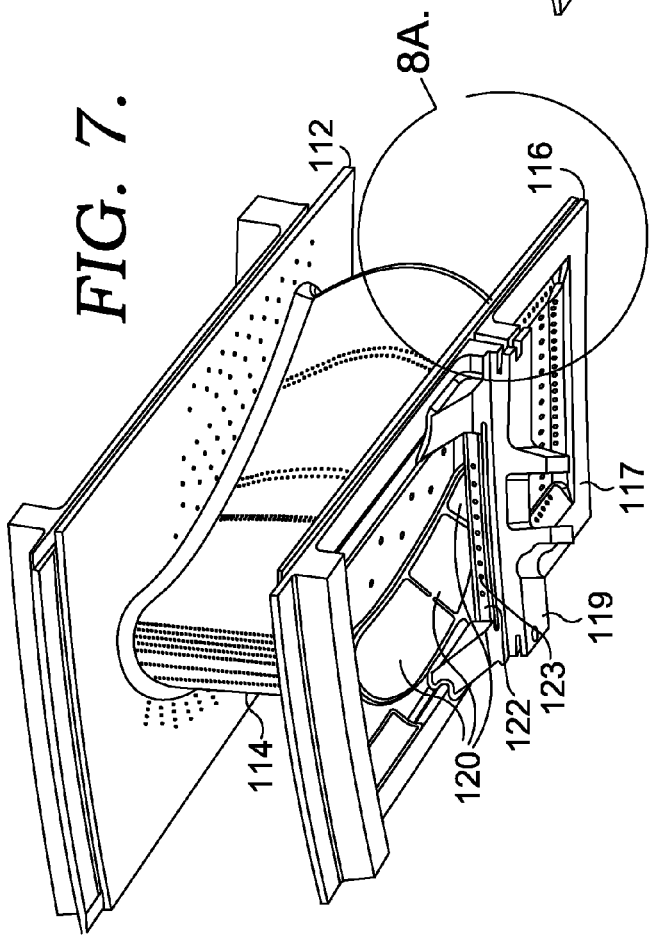

COOLED GAS TURBINE VANE ASSEMBLY

TECHNICAL FIELD

The present invention generally relates to a cooled vane component in a gas turbine engine. More specifically, the gas turbine vane has an improved cooling flow design and lower operating stresses.

BACKGROUND OF THE INVENTION

Gas turbine engines operate to produce mechanical work or thrust. Specifically, land-based gas turbine engines typically have a generator coupled thereto for the purposes of generating electricity. A gas turbine engine comprises an inlet that directs air to a compressor section, which has stages of rotating compressor blades. As the air passes through the compressor, the pressure of the air increases. The compressed air is then directed into one or more combustors where fuel is injected into the compressed air and the mixture is ignited. The hot combustion gases are then directed from the combustion section to a turbine section by a transition duct. The hot combustion gases cause the stages of the turbine to rotate, which in turn, causes the compressor to rotate.

The air and hot combustion gases are directed through a turbine section by turbine blades and vanes. These blades and vanes are subject to extremely high operating temperatures, often times upwards of 2800 deg. F. These temperatures often exceed the material capability from which the blades and vanes are made. Extreme temps also cause thermal growth in the component, which if not permitted, causes thermal stresses and can lead to cracking. In order to lower the effective operating temperature, the blades and vanes are cooled, often with air or steam. However, the cooling must occur in an effective way so as to use the cooling fluid efficiently.

SUMMARY

In accordance with the present invention, there is provided a novel configuration for a gas turbine vane assembly that provides effective cooling to gas-path surfaces while permitting movement of the platform. The vane assembly includes a plurality of airfoil cooling tubes and directed cooling to a vane platform.

In an embodiment of the present invention, a gas turbine vane assembly comprises an outer diameter pan coupled to an outer diameter platform, a hollow airfoil extending radially inward from the outer diameter platform, and an inner diameter platform connected to the hollow airfoil opposite the outer diameter platform such that the platforms are generally parallel to each other. The outer diameter platform has a trailing edge face spaced an axial distance from a leading edge face and includes a plurality of openings capable of receiving a plurality of cooling tubes and a tube collar associated with each of the plurality of openings. The plurality of cooling tubes extend radially inward from the outer diameter platform such that the tube collars are connected to each of the plurality of cooling tubes and the corresponding opening at the outer diameter platform. The plurality of cooling tubes extend through passages in the airfoil. The inner diameter platform includes a trailing edge face, a leading edge face, a plurality of corresponding openings for receiving the plurality of cooling tubes. A cover is fixed to each of the plurality of cooling tubes proximate the inner diameter platform and a forward pan is coupled to a forward end of the inner diameter platform while a meterplate is fixed to the inner diameter platform adjacent to the forward pan and is in fluid communication with an aft pan that is connected to an aft end of the inner diameter platform. The meterplate has a plurality of holes located therein capable of restricting a cooling fluid flow to a desired pressure and mass flow for a region of the holes positioned in the inner diameter platform and in fluid communication with the aft cavity. An aft cover is fixed to the aft end of the inner diameter platform to form an aft cavity. The inner diameter platform also includes a plurality of holes that receive a cooling fluid from the aft pan. An undercut is positioned in the inner diameter platform for providing increased flexibility to the inner diameter platform.

In an alternate embodiment, a flow restriction device capable of controlling a cooling fluid to an aft portion of an inner diameter platform of a gas turbine vane comprises an aft cover fixed to the inner diameter platform forming an aft cavity, a meterplate with a plurality of feed holes fixed to the inner diameter platform between a forward pan and the aft cover, a plurality of file cooling holes located in the inner diameter platform and in fluid communication with the aft cavity, and wherein the cooling fluid is capable of passing through the feed holes of the meterplate, into the aft cavity, and through the plurality of film cooling holes.

In yet another embodiment, an inner diameter platform of a gas turbine vane capable of increased thermal deflection comprise a gas path surface separated from a cold surface by a platform thickness, a forward pan, and an aft cover fixed to the cold surface. The platform thickness having an undercut extending between the gas path surface and cool surface, such that the undercut reduces stiffness of the inner diameter platform adjacent to the aft cover.

Additional advantages and features of the present invention will be set forth in part in a description which follows, and in part will become apparent to those skilled in the art upon examination of the following, or may be learned from practice of the invention. The instant invention will now be described with particular reference to the accompanying drawings.

BRIEF DESCRIPTION OF THE SEVERAL VIEWS OF THE DRAWINGS

The present invention is described in detail below with reference to the attached drawing figures, wherein:

FIG. 2A is a perspective view of an embodiment of the present invention including a plurality tube collars.

FIG. 2B is an alternate perspective view of an embodiment of the present invention that includes an outer diameter pan over the outer diameter platform.

FIG. 7 is a perspective view looking at the cool surface of the inner diameter platform without the inner diameter pan in accordance with an embodiment of the present invention.

FIG. 9 is a perspective view from the cool surface of the inner diameter platform with the inner diameter pan connected to the aft end of the inner diameter platform in accordance with an embodiment of the present invention.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different components, combinations of components, steps, or combinations of steps similar to the ones described in this document, in conjunction with other present or future technologies.

Figure 1:
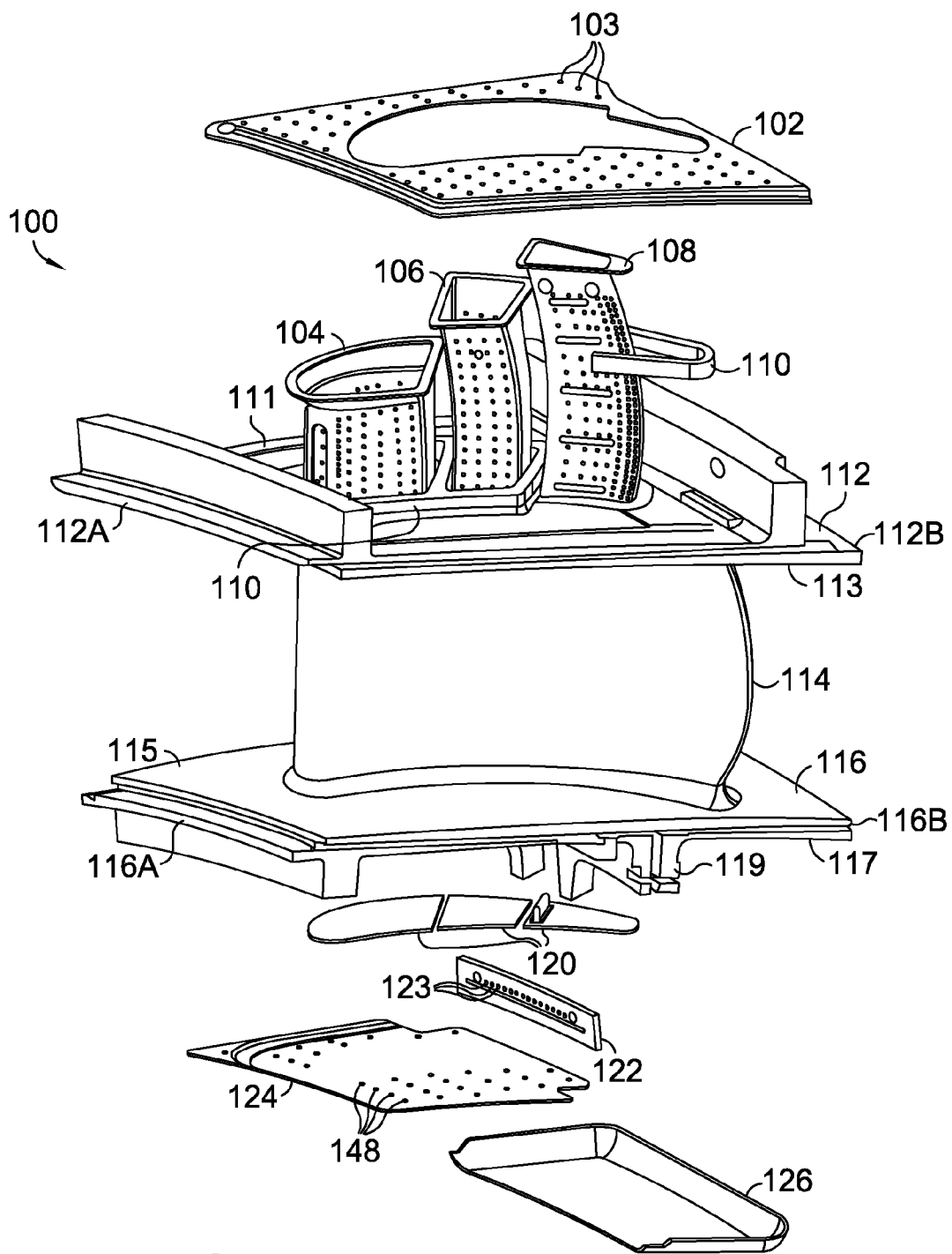
FIG. 1 is an exploded view of the a gas turbine vane in accordance with an embodiment of the present invention.

Referring to FIG. 1, an exploded view of the gas turbine vane 100, is depicted. An outer diameter pan 102 is affixed to the outer diameter platform 112 and has a plurality of holes 103. Acceptable means for fixing the outer diameter pan 102 to the outer diameter platform 112 includes welding or brazing. The outer diameter platform 112 has a cool surface 111 and a gas path surface 113. A plurality of cooling tubes 104, 106, and 108 extend from the outer diameter platform 112. Specifically, the leading edge cooling tube 104, mid-body cooling tube 106, and the trailing edge cooling tube 108 are placed through openings in the outer diameter platform 112, extending through the hollow airfoil 114 and reaching respective openings in the inner diameter platform 116. Each opening in the outer diameter platform 112 has a respective tube collar 110 that is affixed to each of the cooling tubes 104, 106, and 108 and the corresponding opening. The outer diameter platform 112 has a leading edge face 112A and a trailing edge face 112B.

The cooling tubes 104, 106, 108 are capped at the inner diameter platform 116. This embodiment illustrates three cooling tubes but the quantity of cooling tubes is not limited to exclusively three tubes. Covers 120 are affixed to the openings of the tubes to prevent cooling fluid from flowing from the airfoil 114 into the inner diameter platform 116. The inner diameter platform 116 has a gas path surface 115 and a cool surface 117 that are separated by a platform thickness. The inner diameter platform 116 has a leading edge face 116A and a trailing edge face 116B.

Figure 8A:
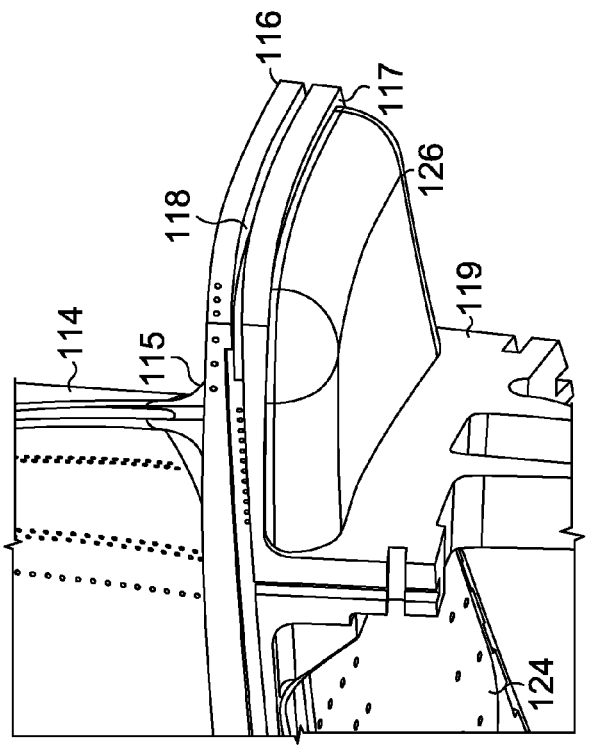
FIG. 8A is a detailed perspective view of a portion of FIG. 7 in accordance with an embodiment of the present invention.
Figure 8B:
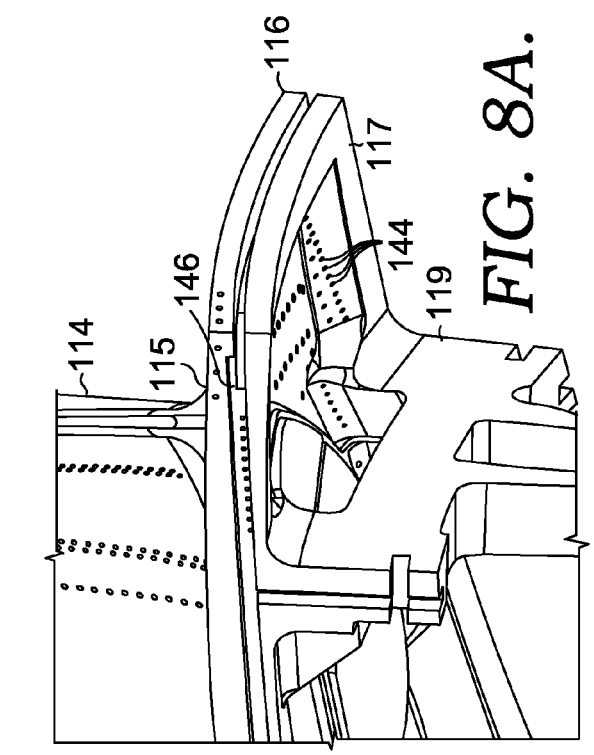
FIG. 8B is a detailed perspective view similar to that of FIG. 8A but with the aft pan in place in accordance with an embodiment of the present invention.

Referring to FIGS. 8A and 8B, an undercut 118 is located within the inner platform thickness of the inner diameter platform 116. The undercut 118 extends between the gas path surface 115 and the cool surface 117 along the thickness of the trailing edge face 116B of the inner diameter platform 116. By providing a greater opening within the thickness, an increase in the flexibility of the inner diameter platform 116 occurs, which helps to decrease the stress in the joint between the aft cover 126 and the inner platform 116. Extending along the inner platform is a rail 119 that provides structural rigidity to the inner diameter platform 116.

A meterplate 122 is affixed to the inner diameter platform 106 adjacent to a forward pan 124. The meterplate 122 is oriented generally perpendicular to the inner diameter platform 116 so as to close an opening in the aft cavity while permitting a flow of the cooling fluid to enter the aft cavity generally parallel to the inner diameter platform 116. The meterplate 122 restricts a supply of fluid flow to a desired pressure and mass flow for a region of film holes between a forward plenum and an aft plenum formed adjacent to the inner diameter platform 116.

A forward pan 124 is affixed to the forward end of the inner diameter platform 116 and has a plurality of cooling holes 148. An aft pan 126 is affixed to the aft end of the inner diameter platform 116 and does not have any cooling holes located therein. The aft pan 126 forms an aft cavity and has a generally flat portion and three sidewalls. Acceptable means for fixing the aft pan and the forward pan includes welding or brazing. In the gas turbine vane assembly 100, the outer diameter platform 112, the airfoil 114, and the inner diameter platform 116 can be one single part, a welded assembly of parts, or any combination in between.

Referring to FIG. 2A, a view of the cool surface 111 of the outer diameter platform 112 without the outer diameter pan 102, is depicted. The outer diameter platform has a trailing edge face and a leading edge face, where the outer diameter platform trailing edge face is spaced an axial distance from the outer diameter platform leading edge face. The openings for each of the cooling tubes is shown and fixed to the openings are the tube collars 110 for the corresponding cooling tubes. Referring to FIG. 2B, a view of the cool surface 111 of the outer diameter platform 112 with the outer diameter pan 102, is depicted. The figure illustrates how the outer diameter pan 102 is affixed to the outer diameter platform 112. The plurality of cooling holes 103 located on the outer diameter pan 102 are oriented at a surface angle relative to the outer diameter platform 112.

Figure 3:
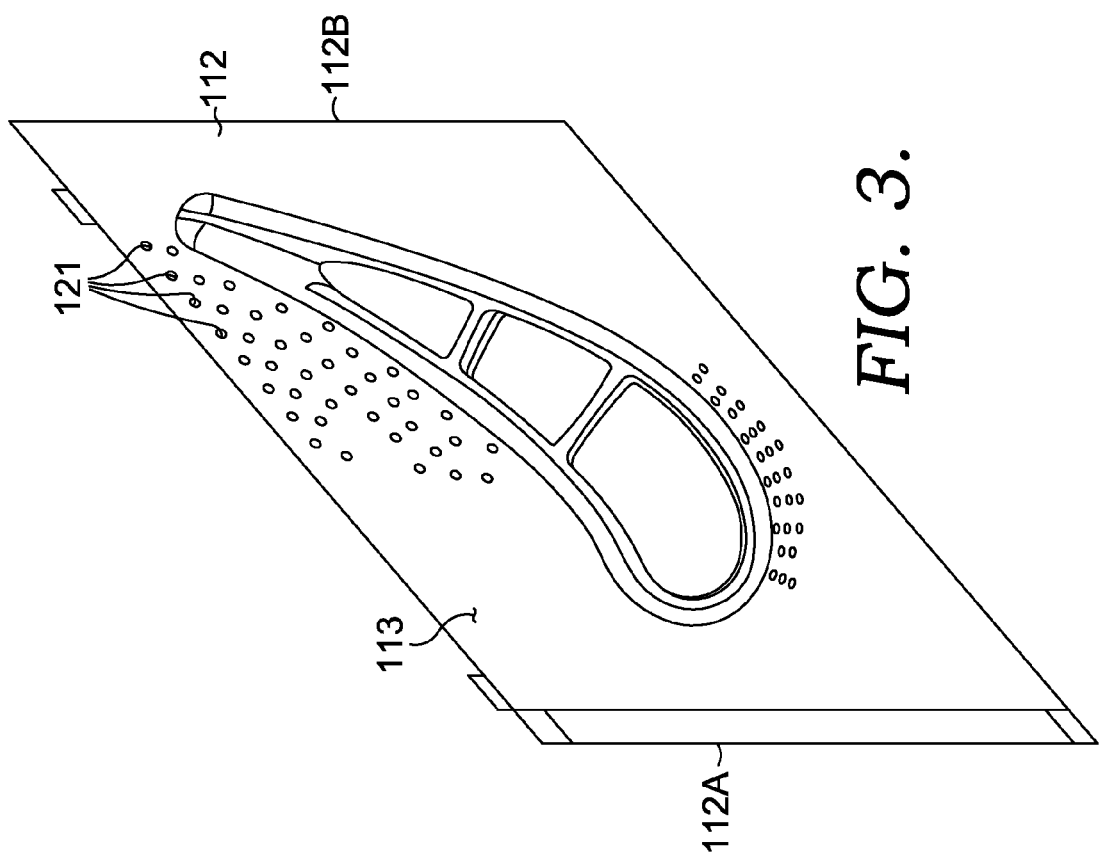
FIG. 3 is a cross section view looking at the gas path surface of the outer diameter platform in accordance with an embodiment of the present invention.

Referring to FIG. 3, a cross section view looking at the gas path surface 113 of the outer diameter platform 112, is depicted. A plurality of cooling holes 121 are illustrated. Also, there are the openings for each of the cooling tubes. The cooling holes 103 located on the outer diameter pan 102 supply cooling fluid to pass through the cooling holes 121 to cool the gas path 113 surface of the outer diameter platform 112.

Figure 4:
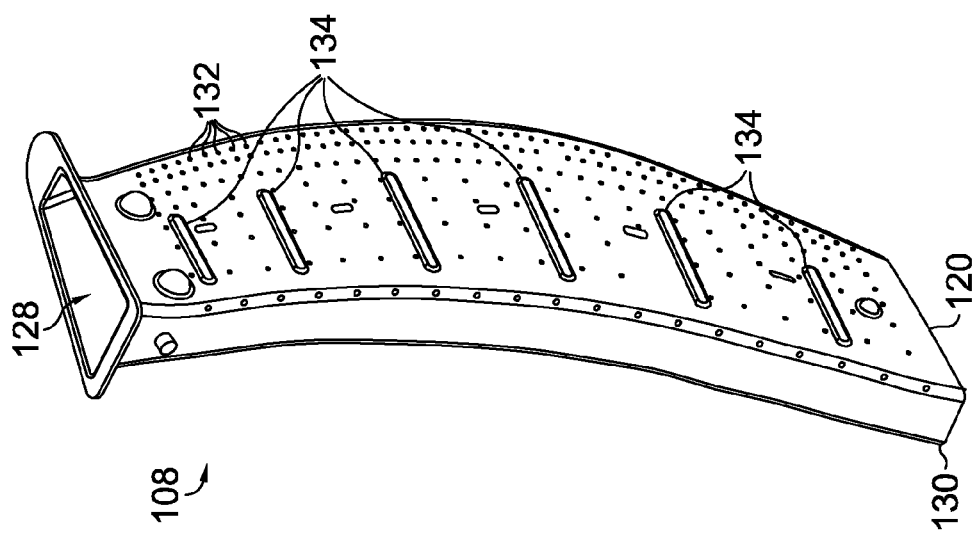
FIG. 4 is a perspective view of a trailing edge cooling tube used in an embodiment of the present invention.

Referring to FIG. 4, an illustration of a trailing edge cooling tube 108, is depicted. The trailing edge (TE) cooling tube 108 has an opening 128, an opposing end 130 and a plurality of cooling holes 132. The opening 128 receives cooling fluid from the outer diameter platform 102 with the cooling fluid passing through the tube 108. The end 130 of the TE cooling tube 108 is closed by a cover 120 which prevents the cooling fluid from flowing into the inner diameter platform 116. Since the cooling fluid is trapped in the body of the TE cooling tube 108, the cooling fluid is forced out through the plurality of holes 132. The cooling fluid exits the cooling tube and is directed towards an inner wall of the airfoil 114 and thus, cooling the airfoil 114. The cooling fluid can be air or stream or a comparable cooling fluid. The TE cooling tube 108 also has raised surfaces 134 along the tube 108. These raised surfaces 134 touch the inside of the airfoil and helps to hold the tube in place.

Figure 5:
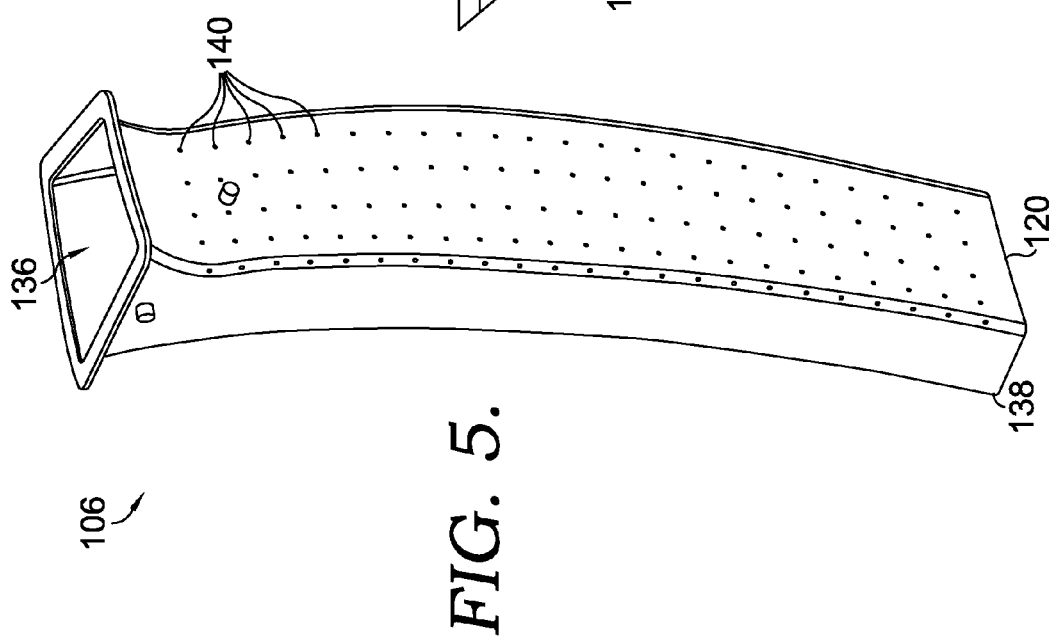
FIG. 5 is a perspective view of a mid-body cooling tube used in an embodiment of the present invention.

Referring to FIG. 5, an illustration of a mid-body cooling tube 106, is depicted. The mid-body cooling tube 106 has an opening 136, and an opposing end 138, and a plurality of cooling holes 140. Similar to the TE cooling tube 108, the mid-body cooling tube 106 directs cooling fluid from the outer diameter platform 112 and into the opening 136 of the mid-body cooling tube 106. The cooling fluid is trapped in the body of the tube 106 because the end 138 is closed off with a cover 120 affixed at the inner diameter platform 116. This forces the cooling fluid to pass through the plurality of holes 140 and onto the inner wall of the airfoil 114.

Figure 6:
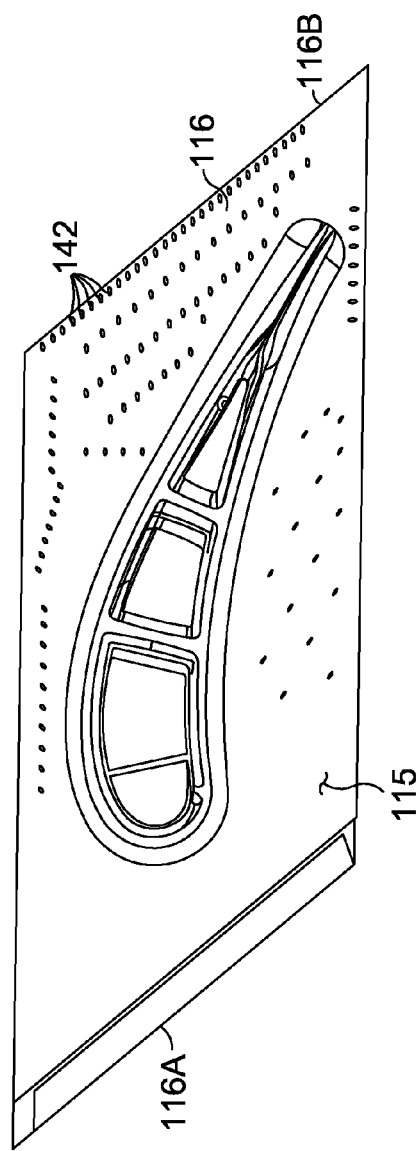
FIG. 6 is a cross section view looking at the gas path surface of the inner diameter platform in accordance with an embodiment of the present invention.

Referring to FIG. 6, a cross section view looking at the gas path surface 115 of the inner diameter platform 116, is depicted. This view is from the gas path side 115 of the turbine vane. The inner diameter platform 116 can have a plurality of cooling holes 142 for directing a supply of cooling fluid along the gas path surface 115 of the inner diameter platform 116. The cooling holes 142 could be oriented at a surface angle relative to the inner diameter platform 116. This allows for improved cooling of the gas path surface 115 of the inner diameter platform 116.

Referring to FIG. 7, a view looking at the cool surface 117 of the inner diameter platform 116 without the inner diameter pan 124, is depicted. The covers 120 are affixed to the cooling tubes to prevent cooling fluid from flowing into the cooling tubes 104, 106, and 108 from the inner diameter platform 116. The meterplate 122 is shown affixed to an inner rail 119 of the inner diameter platform 116.

Referring to FIG. 8A, a close up view of the sidewall portion and trailing edge face 116B of the inner diameter platform 116 of FIG. 7, is depicted. Located in the inner diameter platform 116, and visible in FIG. 8A, is the undercut 118, which for this embodiment, extends generally the axial length of the trailing edge face 116B. The undercut 118 is slot-like in shape, where material of the inner diameter platform 116 has been removed so as to reduce stiffness of the inner diameter platform. FIG. 8A also illustrates an example of a sheet metal seal slot 146 along one of the side walls of the inner diameter platform 116 and outer diameter platform 112. There are a plurality of cooling holes 144 extending through the inner diameter platform 116. Cooling fluid is provided through the cooling holes 148 of the inner diameter pan 124. The cooling fluid is passed through the plurality of holes 144 on the cool side of the inner diameter platform 116. The cooling fluid then passes through the cooling holes 142 on the gas path surface 115 of the inner diameter platform 116 to help cool the gas path surface 115 of the turbine vane. The illustrated slot 146 is an example of the orientation and position of a sealing slot 146. A sheet metal seal fits into the slot 146.

Referring to FIG. 8B, a similar view to FIG. 8A, but with the aft pan 126 included. The aft pan 126 receives the cooling fluid and directs the cooling fluid into the inner diameter platform 116 and through the plurality of cooling holes 144 located along the inner diameter gas path surface 115.

Referring to FIG. 9, a view looking at the cool surface 117 of the inner diameter platform 116 with the inner diameter pan 124, is depicted. The inner diameter pan 124 can have a plurality of cooling holes 148 for receiving a supply of cooling fluid and directing the cooling fluid to holes 142 in the inner diameter platform. In this view of the inner diameter platform 116, the undercut 118, the meterplate 122 and the cooling tube covers 120 are visible.

Figure 10:
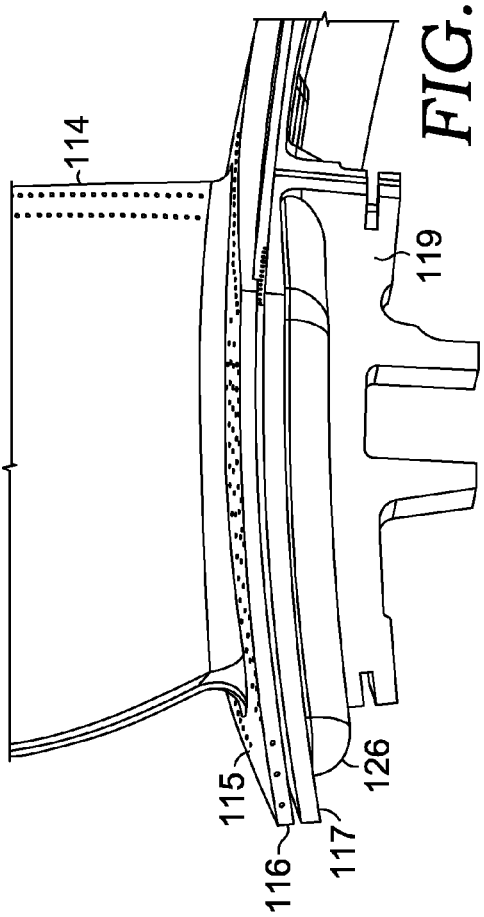
FIG. 10 is a detailed perspective view of an inner diameter platform in accordance with an alternate embodiment of the present invention.

Referring to FIG. 10, a close up, cutaway section of the cool surface 117 of the inner diameter platform 116, is depicted. In this view of the inner diameter platform 116, the undercut 118 and the aft pan 126 are visible.

Figure 11:
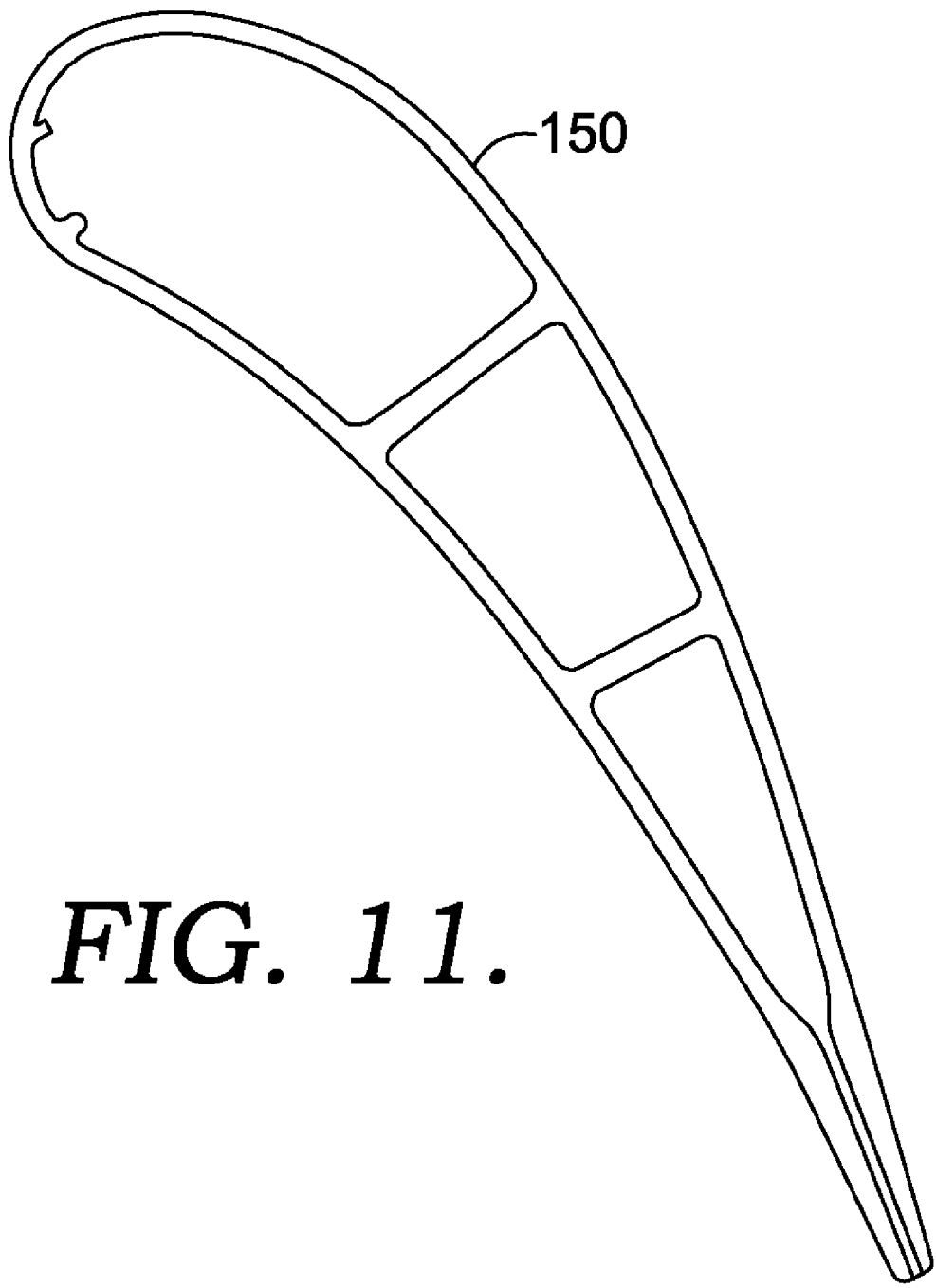
FIG. 11 is a cross section view of the airfoil of the vane assembly in accordance with an embodiment of the present invention.

Referring to FIG. 11, a view from the top of the cross section of the airfoil 114, is depicted. The figure illustrates the three hollow cavities for holding the three cooling tubes 104, 106, and 108. However, the invention is not limited to three cavities within the airfoil and can be more or less than three.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated by and within the scope of the claims.

What is claimed is:

1. A gas turbine vane comprising:
   an outer diameter pan affixed to an outer diameter platform, the outer diameter platform comprising:
      a plurality of openings capable of receiving a plurality of cooling tubes;
      an outer diameter platform trailing edge face spaced an axial distance from an outer diameter platform leading edge face;
      a tube collar associated with the plurality of openings;
      the plurality of cooling tubes extending radially inward from the outer diameter platform such that the tube collars are affixed to each of the plurality of cooling tubes and the corresponding opening;
   a hollow airfoil extending radially inward from the outer diameter platform, the plurality of cooling tubes extending through the airfoil; and,
   an inner diameter platform affixed to the hollow airfoil opposite the outer diameter platform such that the platforms are generally parallel to each other, the inner diameter platform comprising:
      an inner diameter platform trailing edge face;
      an inner diameter platform leading edge face;
      a plurality of openings for receiving the plurality of cooling tubes;
      a cover fixed to each of the plurality of cooling tubes proximate the inner diameter platform;
      a forward pan affixed to a forward end of the inner diameter platform;
      a plurality of film holes located in the inner diameter platform;
      an aft cover affixed to an aft end of the inner diameter platform to form an aft cavity;
      a meterplate affixed to the inner diameter platform adjacent to the forward pan, the meterplate having a plurality of holes located therein capable of restricting a cooling fluid flow to a desired pressure and mass flow for a region of the film holes positioned in the inner diameter platform and in fluid communication with the aft cavity;
      an undercut located within the inner diameter platform, the undercut configured to reduce stiffness of the inner diameter platform.

2. The gas turbine vane of claim 1, wherein the plurality of cooling tubes comprise a trailing edge tube, a mid-body tube, and a leading edge tube.

3. The gas turbine vane of claim 2, wherein the plurality of cooling tubes each have a plurality of cooling holes located therein for directing a cooling fluid flow towards an inner wall of the airfoil.

4. The gas turbine vane of claim 1, wherein the outer diameter pan includes a plurality of cooling holes.

5. The gas turbine vane of claim 1, wherein the outer diameter platform, the airfoil and the inner diameter platform are a single part.

6. The gas turbine vane of claim 1, where the outer diameter platform, the airfoil and the inner diameter platform are a welded assembly.

7. The gas turbine vane of claim 1 further comprising one or more sheet metal seals located within a slot in one or more side walls of the inner diameter platform and outer diameter platform.

8. The cooling circuit for a gas turbine vane of claim 1, wherein the covers affixed to the end of the cooling tubes prevent the cooling fluid from flowing into the inner diameter platform of the gas turbine vane.

9. The gas turbine vane of claim 1, wherein the undercut in the inner rail is located adjacent to a joint between the aft cover and the inner diameter platform.

10. A flow restriction device capable of controlling a cooling fluid to an aft portion of an inner diameter platform of a gas turbine vane comprising:
    an aft cover fixed to the inner diameter platform forming an aft cavity;
    a meterplate fixed to the inner diameter platform between a forward pan and the aft cover, the meterplate having a plurality of feed holes;
    a plurality of film cooling holes located in the inner diameter platform and in fluid communication with the aft cavity;
    wherein the cooling fluid is capable of passing through the feed holes of the meterplate, into the aft cavity, and through the plurality of film cooling holes.

11. The flow restriction device of claim 10, wherein the aft cover is free of holes or perforations.

12. The flow restriction device of claim 11, wherein the aft cover has a generally flat portion and three sidewalls.

13. The flow restriction device of claim 12, wherein the aft cover is welded or brazed to the inner diameter platform.

14. The flow restriction device of claim 10, wherein the meterplate is oriented generally perpendicular to the inner diameter platform so as to close an opening in the aft cavity while permitting a flow of the cooling fluid to enter the aft cavity generally parallel to the inner diameter platform.

15. The flow restriction device of claim 10, wherein the plurality of film cooling holes are oriented at an acute angle relative to the inner diameter platform.

16. The flow restriction device of claim 10, wherein the cooling fluid is compressed air or steam.

17. An inner diameter platform of a gas turbine vane capable of increased thermal deflection comprising:
    a gas path surface separated from a cold surface by a platform thickness;
    a forward pan and an aft cover fixed to the cold surface; and,
    the platform thickness having an undercut extending a distance along a trailing edge face of the inner diameter platform and through a portion of the platform thickness such that the undercut reduces stiffness of the inner diameter platform adjacent to the aft cover.

18. The inner diameter platform of claim 17, wherein the forward pan and aft cover are welded or brazed to the cold surface.

19. The inner diameter platform of claim 18, wherein the undercut is located adjacent to a weld or braze joint between the aft cover and the cold surface of the inner diameter platform.

20. The inner diameter platform of claim 19, wherein the undercut, relative to an axial centerline, is located radially outward of an inner rail of the inner diameter platform.

* * * * *